US009390611B1

(12) United States Patent
Maruyama et al.

(10) Patent No.: US 9,390,611 B1
(45) Date of Patent: Jul. 12, 2016

(54) SMART ALERT SYSTEM IN ELECTRONIC DEVICE

(71) Applicant: International Business Machines Corporation, Armonk, NY (US)

(72) Inventors: Daisuke Maruyama, Yamato (JP); Takeshi Watanabe, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/950,046

(22) Filed: Nov. 24, 2015

(51) Int. Cl.
*G08B 1/08* (2006.01)
*G08B 21/00* (2006.01)
*G08B 25/00* (2006.01)
*G08B 29/00* (2006.01)
*H04B 1/38* (2015.01)
*H04W 24/00* (2009.01)
*H04M 1/725* (2006.01)
*H04M 3/00* (2006.01)
*G09G 5/00* (2006.01)
*A63B 71/00* (2006.01)
*G08B 25/01* (2006.01)

(52) U.S. Cl.
CPC ............ *G08B 25/008* (2013.01); *G08B 25/016* (2013.01)

(58) Field of Classification Search
CPC ........ G08B 25/016; G08B 21/22; G08B 3/10; G08B 25/14; A61B 5/0002; G06Q 10/08; G06Q 10/1095; G06F 3/0485; H04M 19/04; H04W 4/02; H04L 29/06
USPC .................. 340/539.11, 539.12, 539.13, 540, 340/573.1, 309.15, 506; 715/819, 825; 455/567, 456.3, 412.2, 419; 345/634; 482/3; 370/401; 705/7.19; 601/167
See application file for complete search history.

(56) References Cited

U.S. PATENT DOCUMENTS

| | | | |
|---|---|---|---|
| 2009/0305744 A1 | 12/2009 | Ullrich | |
| 2011/0169620 A1* | 7/2011 | Yang ...................... | G04G 13/02 340/309.16 |
| 2013/0137464 A1* | 5/2013 | Kramer .................. | G06Q 30/02 455/456.3 |
| 2013/0250734 A1* | 9/2013 | Narasani .............. | G06Q 10/109 368/9 |
| 2014/0007010 A1 | 1/2014 | Blom | |
| 2014/0074535 A1* | 3/2014 | Woo-Kwan-Chung | G06Q 10/1095 705/7.19 |
| 2014/0157184 A1* | 6/2014 | Piccinini ............... | G06F 9/4443 715/781 |
| 2015/0017954 A1* | 1/2015 | Patel ..................... | H04M 19/04 455/414.1 |

OTHER PUBLICATIONS

Hashimoto et al., "Study of Interruption Denial Estimation Method Based on Conversation Status Detection and PC Operating History", Information Processing Society of Japan 75th Annual Conference, © 2013 Information Processing Society of Japan, 6 pages.
Horikomi, "Android automatic setting app 'Silence' that syncs with Google Calendar", lifehacker, May 10, 2013, 1 page, <http://www.lifehacker.jp/2013/05/130510silence_for_android.html>.

(Continued)

*Primary Examiner* — George Bugg
*Assistant Examiner* — Munear Akki
(74) *Attorney, Agent, or Firm* — Alexa L. Ashworth

(57) ABSTRACT

Embodiments of the present invention provide a method, computer program product, and computer system for dynamically controlling an alert function on an electronic device. The method includes determining whether a user is engaged in a conversation with at least one other person. Voice and facial recognition technology determine whether the other person is an important person. If it is determined that the other person is an important person the alert function on the device will be disabled.

21 Claims, 7 Drawing Sheets

(56) References Cited

OTHER PUBLICATIONS

Karatsu, "Introducing Chat Group Detection System Using Android Terminal", 2011, 25 pages, <http://www.ht.sfc.keio.ac.jp/~karasu/pub/ABC2011_public.pdf>.

"Image Sensing Application Example According to Technology: Facial Expression Estimation", Printed Jul. 24, 2015, pp. 1-5, <http://plus-sensing.omron.co.jp/function/expression/?srtfun=15>.

"Smartlock function that unlocks Android using voice, recognizes speaker with 'OK Google'", Android Police, © Copyright 2015 AOL Online Japan, Ltd., Printed Jul. 24, 2015, pp. 1-2, <http://japanese.engadget.com/2015/04/15/android-ok-google>.

"Voice and Speech Recognition—Consumer, Call Center, Healthcare, Enterprise, Finance, Retail, Government, Law Enforcement and Defense Applications: Market Analysis and Forecasts", Tractica, Global Information, Jun. 10, 2015, 7 pages, <http://www.gii.co.jp/report/trac332285-voice-speech-recognition-consumer-call-center.html>.

* cited by examiner

400

| Conversation Parameters | 410 | Conversation Importance Axes | 430 |
|---|---|---|---|
| Relation | 412 | Personal Connection | 432 |
| Frequency of Contact | 414 | Frequency of Contact | 434 |
| Age Gap | 416 | Personal Connection | 432 |
| Countenance | 418 | Mood | 436 |
| Alcohol Detection | 420 | Mood | 436 |
| Perspiration Level | 422 | Mood | 436 |
| Heart Rate | 424 | Health, Mood | 438, 436 |
| ⋮ | | ⋮ | |

| Relationships | | 450 | Scores 490 |
|---|---|---|---|
| Family | Partner | 452 | 100 |
| | Children | 454 | 90 |
| | Parents | 456 | 80 |
| | Other Relatives | 458 | 40 |
| Business | Bosses (Managers) | 460 | 50 |
| | Colleagues | 462 | 63 |
| | Clients-Closed | 464 | 40 |
| | Clients-New | 466 | 35 |
| Alumnus | Seniors | 468 | 55 |
| | Peers | 470 | 70 |
| | Juniors | 472 | 65 |
| Friends | | 474 | 60 |
| Others | Friends Linked by SNS | 476 | 45 |
| | Friends of Friends | 478 | 40 |
| | No Relationship | 480 | 0 |
| ⋮ | ⋮ | | ⋮ |

FIG. 4B

SMART ALERT SYSTEM IN ELECTRONIC DEVICE

BACKGROUND OF THE INVENTION

The present invention relates generally to the field of electronic devices, and more particularly to using detection technology to identify the importance of a conversation to provide smart disablement of an alert function.

Wearable technology, wearables, fashionable technology, wearable devices, tech togs, or fashion electronics are clothing and accessories incorporating computer and advanced electronic technologies. The designs often incorporate practical functions and features, but may also have a purely critical or aesthetic agenda. Wearable devices such as activity trackers are a good example of the Internet of Things (IoT), since they are part of the network of physical objects or "things" embedded with electronics, software, sensors and connectivity to enable objects to exchange data with a manufacturer, operator and/or other connected devices, without requiring human intervention.

Sensors and wearables allow continuous physiological monitoring with reduced manual intervention and at low cost. Sensors and wearables can be integrated into various accessories such as garments, hats, wrist bands, socks, shoes, eyeglasses and other devices such as wristwatches, headphones, and smartphones. Some sensors, mostly medical-grade ones, are used on a stand-alone basis. Many wearable tech products use multiple digital health sensors that are typically integrated into sensor networks comprising other body-worn sensors and/or ambient sensors.

SUMMARY

A method, computer program product, and computer system for dynamically controlling an alert function are provided, the method comprising: receiving, by one or more computer processors, a set of data regarding a meeting schedule; determining, by one or more computer processors, whether a user is engaged in a conversation with at least one other person based in part on the meeting schedule; in response to determining that the user is engaged in a conversation with at least one other person, determining, by one or more computer processors, whether the at least one other person is an important person; in response to determining that the at least one other person is an important person, determining, by one or more computer processors, whether an alert function is enabled on a wearable device; and in response to determining that the alert function is enabled on the wearable device, disabling, by one or more computer processors, the alert function, wherein disabling the alert function limits incoming notifications, based on a predefined notification setting.

BRIEF DESCRIPTION OF THE DRAWINGS

FIG. 4A is a table illustrating the parameters of conversation and their corresponding axes, in accordance with an embodiment of the present invention;

FIG. 4B is a table illustrating an example of the values of various relationships to be charted on the personal connection axis, in accordance with an embodiment of the present invention;

DETAILED DESCRIPTION

A typical smartwatch has an alert or notification function when it receives a message, email, telephone call, etc. that may result in showing messages on a screen, sound, or vibration. Users react to these notifications, which may draw attention away from and disrupt an ongoing conversation. Such a reaction may also be impolite and show disrespect to a conversational partner. To avoid this situation, a smartwatch has operational modes, such as "silent," to disable the alert functions, however, manually enabling and disabling the alert function is not always convenient to the user. Embodiments of the present invention provide systems and methods for situationally enabling and disabling the alert function of a smartwatch based on the importance of a conversation or meeting.

Figure 1:
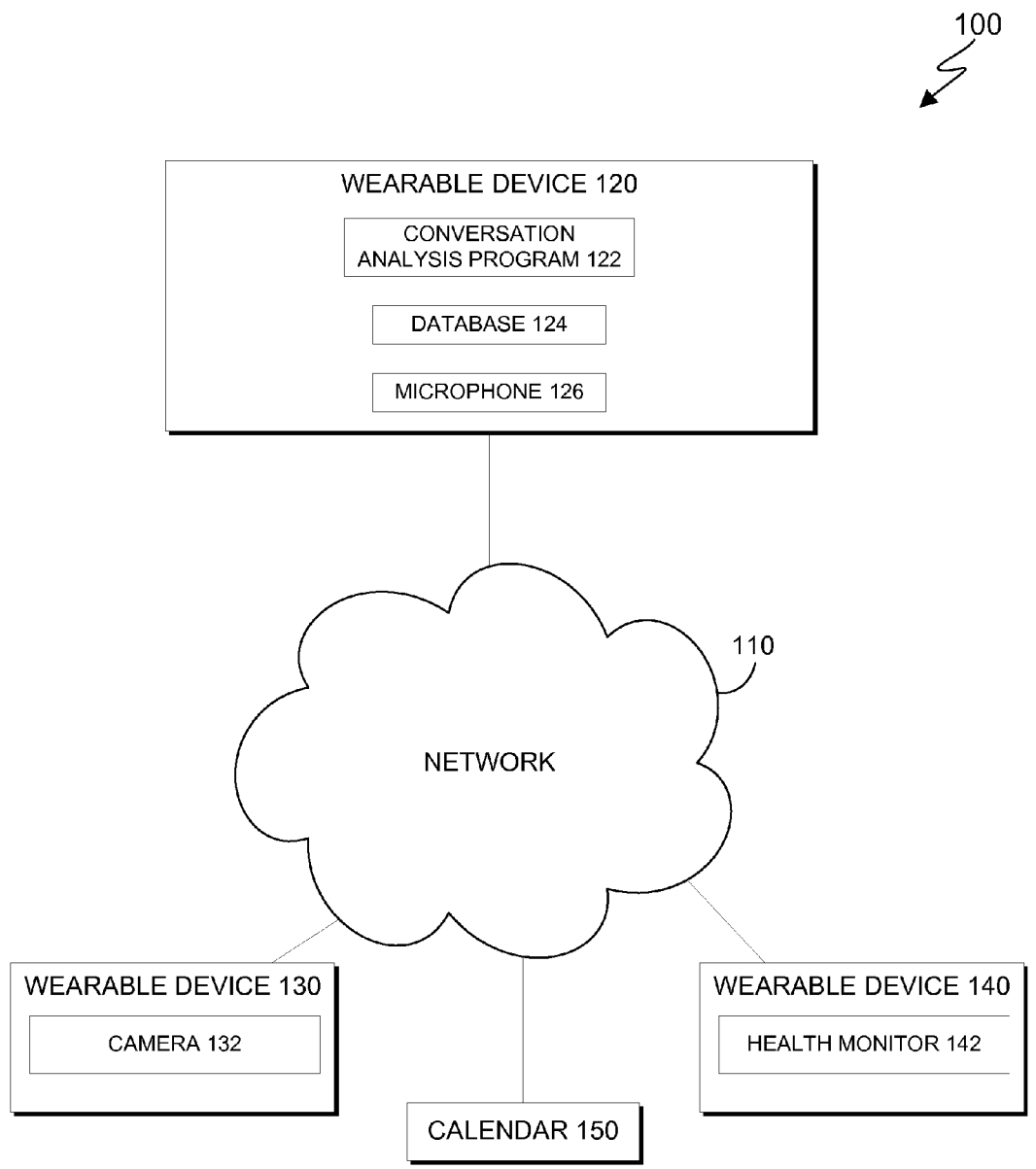
FIG. 1 is a functional block diagram illustrating an environment, in accordance with an embodiment of the present invention.

The present invention will now be described in detail with reference to the figures. FIG. 1 is a functional block diagram illustrating a conversation importance detection environment, generally designated 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, conversation importance detection environment 100 includes wearable device 120, wearable device 130, wearable device 140, and calendar 150 interconnected over network 110.

Network 110 can be, for example, a local area network (LAN), a wide area network (WAN) such as the Internet, or a combination of the two, and can include wired, wireless, or fiber optic connections. Network 110 may also be Bluetooth, or a similar method of connecting devices. In general, network 110 can be any combination of connections and protocols that will support communication between wearable device 120 and wearable device 130, wearable device 140, and calendar 150.

Wearable device 120 may be any wearable computing device, such as a smartwatch, capable of communicating with wearable devices 130, 140, and calendar 150 via network 110.

Wearable device 120 includes conversation analysis program 122, database 124, and microphone 126. It should be appreciated that wearable device 120 may contain any other detection devices needed to capture the importance of a conversation, such as a health monitoring system that monitors body temperature and perspiration. In this exemplary embodiment, wearable device 120 includes microphone 126 that is capable of capturing sound of conversational partners. Conversation analysis program 122 will utilize the sound data captured by microphone 126 to identify a person by voice recognition. Wearable device 120 may include internal and external hardware components, as depicted and described in further detail with respect to FIG. 7.

Conversation analysis program 122 is capable of analyzing data located in database 124, and data received from microphone 126, wearable device 130 and 140, and calendar 150. Conversation analysis program 122 determines the importance of a conversation. Based on the importance of the conversation, conversation analysis program 122 determines whether to enable or disable the alert function.

Database 124 is a central storage for a set of conversation model parameters data. Database 124 may also include a set of data associated with persons to which the user has a relationship with (i.e., voice recognition data for a user's father, facial recognition data for a boss, personal connection scores, etc.). Database 124 can be implemented using any non-volatile storage medium known in the art.

Wearable device 130 may be any wearable computing device capable of communicating with wearable device 120 via network 110. In this exemplary embodiment, wearable device 130 includes camera 132 that is capable of capturing facial images of conversational partners. Conversation analysis program 122 will utilize the data captured by wearable device 130 to identify a person by image recognition along with a contact list or social network information. Conversation analysis program 122 will also utilize the data captured by wearable device 130 to determine countenance of conversational partners (i.e., facial expressions). Wearable device 130 may include internal and external hardware components, as depicted and described in further detail with respect to FIG. 7.

Wearable device 140 may be any wearable computing device capable of communicating with wearable device 120 via network 110. In this exemplary embodiment, wearable device 140 includes health monitor 142 that is capable of capturing body signals, such as heart rate, body temperature, and perspiration, and calculates the stress level of the user. Conversation analysis program 122 will utilize the data captured by wearable device 140 to calculate the stress level of the user. Conversation analysis program 122 determines the stress level of the user to determine if the conversation is serious. Wearable device 140 may include internal and external hardware components, as depicted and described in further detail with respect to FIG. 7.

Calendar 150 may be any calendar application capable of communicating with wearable device 120 via network 110. In this exemplary embodiment, calendar 150 is a personal calendar application that can synchronize with other calendar services that is capable of saving user busy times (i.e., meetings). Conversation analysis program 122 utilizes the data stored in calendar 150 to determine the times in which the user plans to interact with others (i.e., engage in conversations with others).

Figure 2:
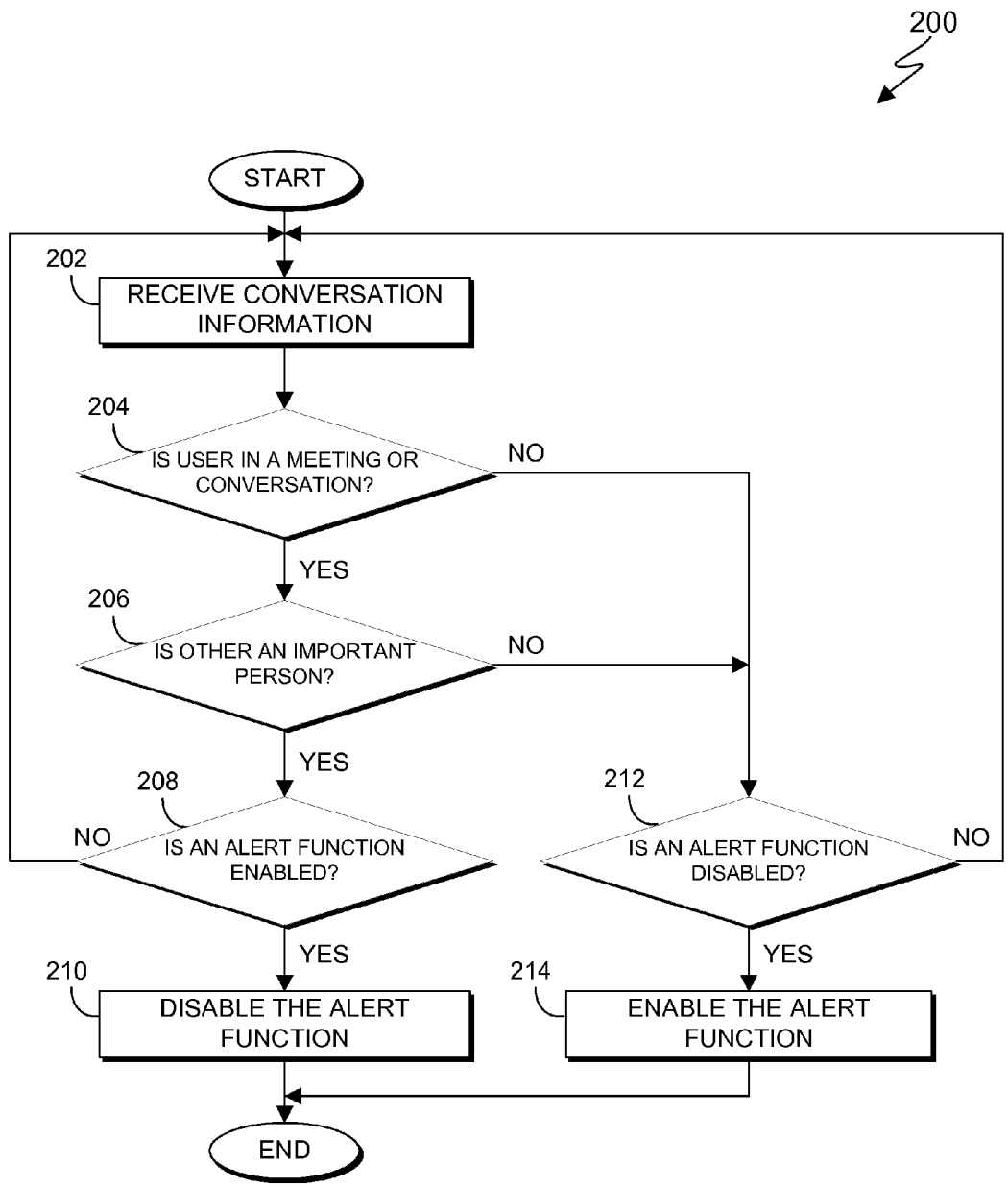
FIG. 2 is a flowchart depicting operational steps for determining the importance of a conversation and manipulating the alert function accordingly, in accordance with an embodiment of the present invention.

FIG. 2 is a flowchart, 200, depicting operational steps for determining the importance of a conversation and manipulating the alert function accordingly, in accordance with an embodiment of the present invention.

In step 202, conversation analysis program 122 receives information regarding a conversation. In this exemplary embodiment, conversation analysis program 122 receives information from database 124, microphone 126, camera 132, health monitor 142, and calendar 150.

In step 204, conversation analysis program 122 determines if the user is in a meeting or conversation. In this exemplary embodiment, conversation analysis program 122 determines if the user is in a meeting based on the information gathered in step 202. For example, conversation analysis program 122 utilizes information from calendar 150 to determine if the user was scheduled to have an engagement. Conversation analysis program 122 utilizes microphone 126 to determine if the user is currently having a conversation. Conversation analysis program 122 utilizes camera 132 to determine if the user is engaged with another person (i.e., the user is looking at another person and that person is within a predetermined distance from the user).

If, in step 204, conversation analysis program 122 determines that the user is not in a meeting or conversation, then in step 212 conversation analysis program 122 determines whether an alert function is disabled on wearable device 120. If, in step 212, conversation analysis program 122 determines that an alert function is disabled on wearable device 120, then in step 214 conversation analysis program 122 enables the alert function on wearable device 120. If, in step 212, conversation analysis program 122 determines that an alert function is not disabled (i.e., enabled) on wearable device 120, then conversation analysis program 122 does nothing and the process begins again from step 202.

If, in step 204, conversation analysis program 122 determines that the user is in a meeting or conversation, then in step 206 conversation analysis program 122 determines whether the other person is an important person. In this exemplary embodiment, conversation analysis program 122 determines if the other person is an important person based on the information gathered in step 202. For example, conversation analysis program 122 utilizes information from camera 132 to match facial images with contact profile data in database 124, to determine if the other person has been predetermined to be an important person. Conversation analysis program 122 utilizes information from camera 132 to determine the seriousness of a conversation. For example, imagery captured by camera 132 is used by conversation analysis program 122 to determine if the other person is smiling or not smiling (i.e., frowning), which can be used to indicate a friendly, less serious, conversation or an important, more serious, conversation, respectively. Conversation analysis program 122 utilizes information from health monitor 142 to determine the stress level of the user. For example, if the user has an elevated heart rate, body temperature, or perspiration level, conversation analysis program 122 may determine that the user has an increased stress level and that the conversation is serious, indicating that the other person is important.

If, in step 206, conversation analysis program 122 determines that the other person is not an important person, then in step 212 conversation analysis program 122 determines whether an alert function is disabled on wearable device 120.

If, in step 206, conversation analysis program 122 determines that the other person is an important person, then in step 208 conversation analysis program 122 determines whether an alert function is enabled on wearable device 120.

If, in step 208, conversation analysis program 122 determines that an alert function is enabled on wearable device 120, then in step 210 conversation analysis program 122 disables the alert function on wearable device 120. If, in step 208, conversation analysis program 122 determines that the alert function is not enabled on wearable device 120 (i.e., the function is disabled), then conversation analysis program 122 does nothing and the process begins again from step 202.

Accordingly, by performing the operational steps of FIG. 2, conversation analysis program 122 determines if a user is in a meeting or conversation and the importance of the meeting or conversation.

Figure 3:
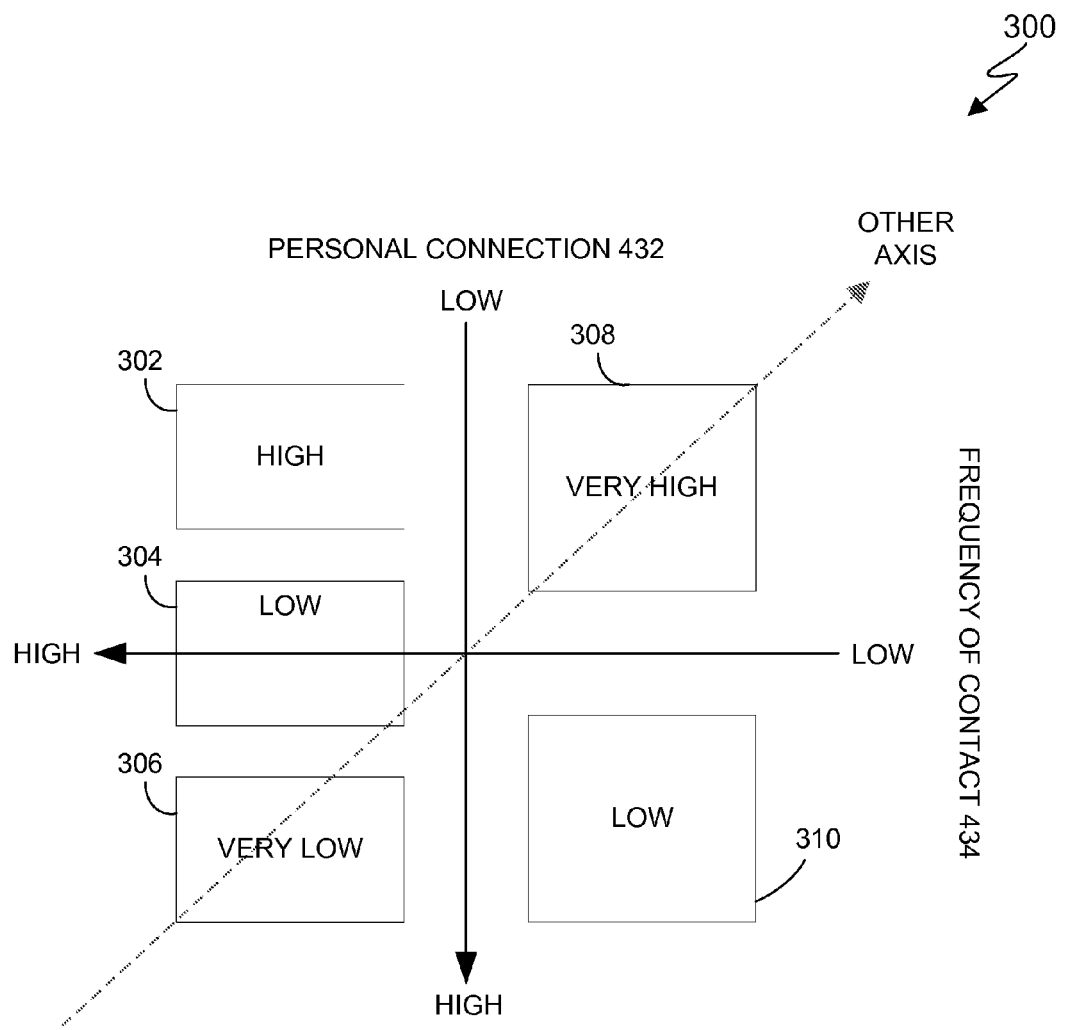
FIG. 3 is a diagram illustrating a mapping of conversation importance level, in accordance with an embodiment of the present invention.
Figures 6A, 6B, 6C:
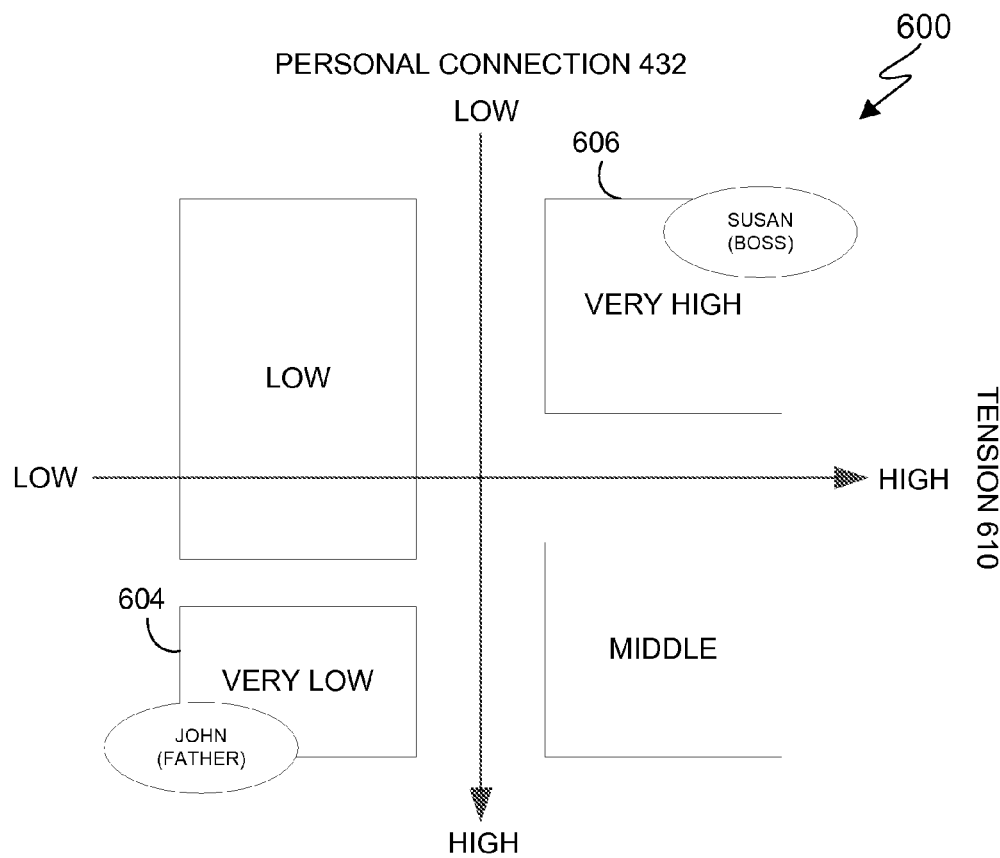
FIG. 6A is an example diagram of a conversation model illustrating the level of importance, in accordance with an embodiment of the present invention.
FIGS. 6B and 6C are examples of the parameters of conversation and their corresponding axes relationship values of two others, in accordance with an embodiment of the present invention.

FIG. 3 is a diagram, 300, illustrating a mapping of conversation importance level, in accordance with an embodiment of the present invention. In this exemplary embodiment, conversation analysis program 122 determines importance of conversations based on the personal connection of the user to the other person (conversation importance axis personal connection 432) and the frequency of contact between the user and the other person (frequency of contact 434). It should be appreciated that other axes, such as conversation importance axis health 438 or conversation importance axis mood 436, may be used (FIG. 6A). For example, a conversation occurring between a user and another person, to which there is low personal connection and low frequency of contact is considered a conversation having very high importance 308. On the other hand, a conversation occurring between a user and another person, to which there is high personal connection and high frequency of contact is considered a conversation having very low importance 306. A conversation occurring between a user and another person, to which there is low personal connection and high frequency of contact is considered a conversation having high importance 302. Oppositely, a conversation occurring between a user and another person, to which there is high personal connection and low frequency of contact is considered a conversation having low importance 310. A conversation occurring between a user and another person, to which there is a mid-level personal connection and a high frequency of contact is considered a conversation having low importance 304.

FIG. 4A is a table, 400, illustrating the parameters of conversation and their corresponding axes, in accordance with an embodiment of the present invention. In this exemplary embodiment, conversation parameters 410 and the corresponding conversation importance axes 430 are compiled in a table. For example, conversation parameters relation 412 and age gap 416 each utilize conversation importance axis personal connection 432. Conversation parameters countenance 418, alcohol detection 420, and perspiration level 422 utilize conversation importance axis mood 436. Conversation parameter heart rate 424 utilizes conversation importance axes health 438 and mood 436. Conversation parameter frequency of contact 414 uses conversation importance axes frequency of contact 434.

FIG. 4B is a table, 440, illustrating an example of the values (or scores) of various relationships to be charted on the personal connection axis, in accordance with an embodiment of the present invention. As illustrated in FIG. 4A, conversation parameter relation 412 is represented on conversation importance axis personal connection 432. In this exemplary embodiment, relationships 450 and the respective scores 490 are compiled in a table. It should be appreciated, however, that the use of scores 490 in FIG. 4B is just one example of how a conversation parameter, relationship 450, can demonstrate the importance of human relationship by an absolute number, and any other suitable parameters may be used. In the instant example, generally, a higher personal connection score represents a low conversation importance, whereas a lower personal connection score represents a high conversation importance. For example, for family relationships, partner 452, children 454, parents 456, and other relatives 458 receive scores of 100, 90, 80, and 40, respectively. For business relationships, bosses 460, colleagues 462, clients-closed 464, and clients-new 466 receive scores of 50, 63, 40, and 35, respectively. For alumnus, seniors 468, peers 470, and juniors 472 receive scores of 55, 70, and 65, respectively. The term "alumnus" is used for relationships involving seniors and juniors in a company or university. In general, a senior is an older person and a junior is a younger person. If a user engages in a conversation with a senior, the conversation would be more important than engaging in a conversation with a junior. Friends 474 receive a score of 60. Other relationships including friends linked by social networking service (SNS) 476, friends of friends 478, and no relationship 480 receive scores of 45, 40, and 0, respectively.

Figures 5A, 5B, 5C:
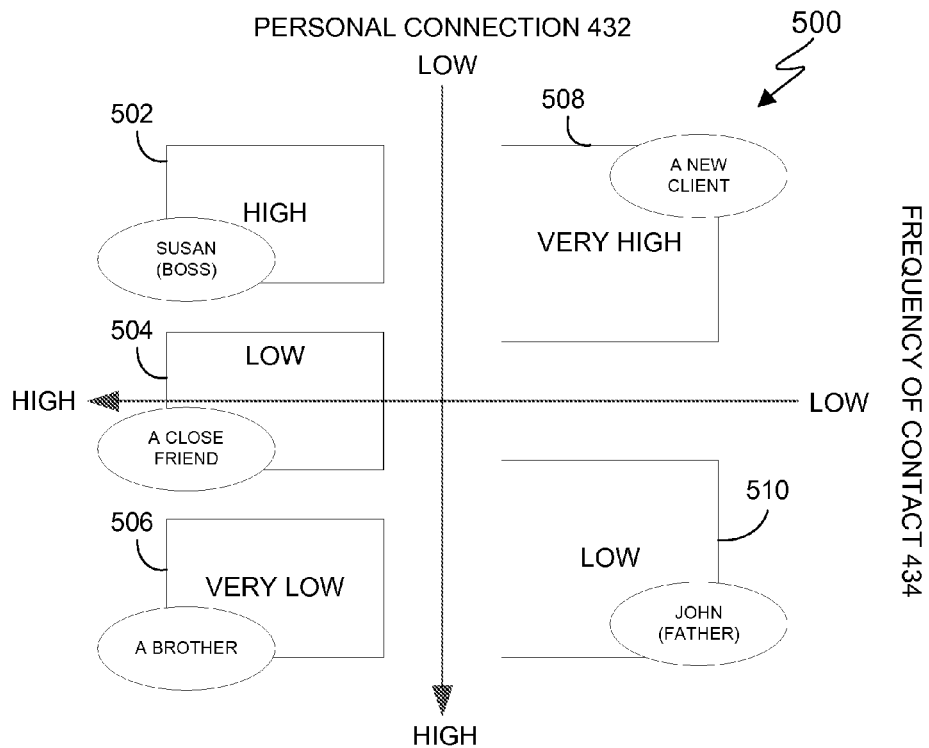
FIG. 5A is an example diagram of a conversation model illustrating the level of importance of a conversation, in accordance with an embodiment of the present invention.
FIGS. 5B and 5C are diagrams illustrating examples of conversation parameters and the corresponding values for two others such that they can be mapped according to the corresponding conversation importance axes, in accordance with an embodiment of the present invention.

FIG. 5A is an example diagram, 500, of a conversation model illustrating the level of importance, in accordance with an embodiment of the present invention. FIGS. 5B and 5C are tables, 530 and 550 respectively, illustrating examples of conversation parameters and the corresponding values for two others such that they can be mapped according to the corresponding conversation importance axes of FIG. 4A, in accordance with an embodiment of the present invention. In this exemplary embodiment, FIG. 5A illustrates some examples of the conversation importance of others as determined by the conversation importance map (FIG. 3). In this exemplary embodiment, FIG. 5A illustrates some examples of the conversation importance of others as determined by the axes personal connection 432 and frequency of contact 434.

For example, conversation analysis program 122 utilizes microphone 126, camera 132, and information stored in database 124 to determine that the user is talking to his father, John (step 204). Conversation analysis program 122 then determines if John is an important person (step 206). As illustrated in FIG. 5B, the frequency of contact between the user and John is low: two times per year face to face; one time per year over the telephone; and three times per month through email/SNS. John is twenty-eight years older than the user. Conversation analysis program 122 utilizes camera 132 to determine John's countenance, which is relaxed. Conversation analysis program 122 utilizes health monitor 142 to determine that the user is buzzed and has a low heart rate. John therefore carries a high personal connection score (e.g., 80 in FIG. 4B) and the conversation between the user and John has a low level of importance (510). Therefore, conversation analysis program 122 will not disable the alert function. In this exemplary embodiment, conversation analysis program 122 determines the blood alcohol content (BAC) of a user through an alcohol detection sensor device (i.e., in a smartwatch or separate device). In another embodiment, conversation analysis program 122 uses voice to text analysis technology to analyze the contents of the conversation (i.e., detecting slurred words). It should be appreciated, however, that any suitable method for detecting alcohol consumption may be used.

In another example, conversation analysis program 122 receives information from calendar 150 to determine that the user and Susan are scheduled to have a meeting (step 202). Conversation analysis program 122 utilizes microphone 126, camera 132, and information stored in database 124 to determine that the user is talking to his boss, Susan (step 204). Conversation analysis program 122 then determines if Susan is an important person (step 206). As illustrated in FIG. 5C, the frequency of contact between the user and Susan is high: one time per day face to face; three times per year over the telephone; and two times per day through email/SNS. Susan is fifteen years older than the user. Conversation analysis program 122 utilizes camera 132 to determine Susan's countenance, which is serious. Conversation analysis program 122 utilizes health monitor 142 to determine that the user is sober and has a high heart rate. Susan therefore carries a low personal connection score (e.g., 50 in FIG. 4B) and the conversation between the user and Susan has a high level of importance (502). Therefore, conversation analysis program 122 will disable the alert function.

Other examples illustrated in FIG. 5A are a new client, a close friend, and a brother. A new client carries a very low personal connection score (e.g., 35 in FIG. 4B) and a very low frequency of contact. Therefore, the conversation between the user and a new client has a very high level of importance (508) and conversation analysis program 122 will disable the alert function. A close friend carries a mid-range personal connection score (e.g., 60 in FIG. 4B) and a very high frequency of contact. Therefore, the conversation between the user and a close friend has a low level of importance (504) and conversation analysis program 122 will not disable the alert function. A brother carries a very high personal connection score and a very high frequency of contact. Therefore, the conversation between the user and a brother has a very low level of importance (506) and conversation analysis program 122 will not disable the alert function.

FIG. 6A is an example diagram, 600, of a conversation model illustrating the level of importance, in accordance with an embodiment of the present invention. FIGS. 6B and 6C are tables, 630 and 650 respectively, illustrating examples of the parameters of conversation and their corresponding axes relationship values of two others, in accordance with an embodiment of the present invention (FIG. 4A). In this exemplary embodiment, FIG. 6A illustrates some examples of the conversation importance of others as determined by the axes personal connection 432 and tension 610.

For example, conversation analysis program 122 utilizes microphone 126, camera 132, and information stored in database 124 to determine that the user is talking to his father, John (step 204). Conversation analysis program 122 then determines if John is an important person (step 206). As illustrated in FIG. 6B, John is twenty-eight years older than the user. Conversation analysis program 122 utilizes health monitor 142 to determine that the user is buzzed, has a low level of perspiration, and has a heart rate of 70. John therefore carries a high personal connection score (e.g., 80 in FIG. 4B), a low tension level, and the conversation between the user and John has a very low level of importance (604). Therefore, conversation analysis program 122 will not disable the alert function.

In another example, conversation analysis program 122 receives information from calendar 150 to determine that the user and Susan are scheduled to have a meeting (step 202). Conversation analysis program 122 utilizes microphone 126, camera 132, and information stored in database 124 to determine that the user is talking to his boss, Susan (step 204). Conversation analysis program 122 then determines if Susan is an important person (step 206). As illustrated in FIG. 6C, Susan is fifteen years older than the user. Conversation analysis program 122 utilizes health monitor 142 to determine that the user is sober, has a high level of perspiration, and has a heart rate of 130. Susan therefore carries a low personal connection score (e.g., 50 in FIG. 4B), a high tension level, and the conversation between the user and Susan has a very high level of importance (606). Therefore, conversation analysis program 122 will disable the alert function.

Figure 7:
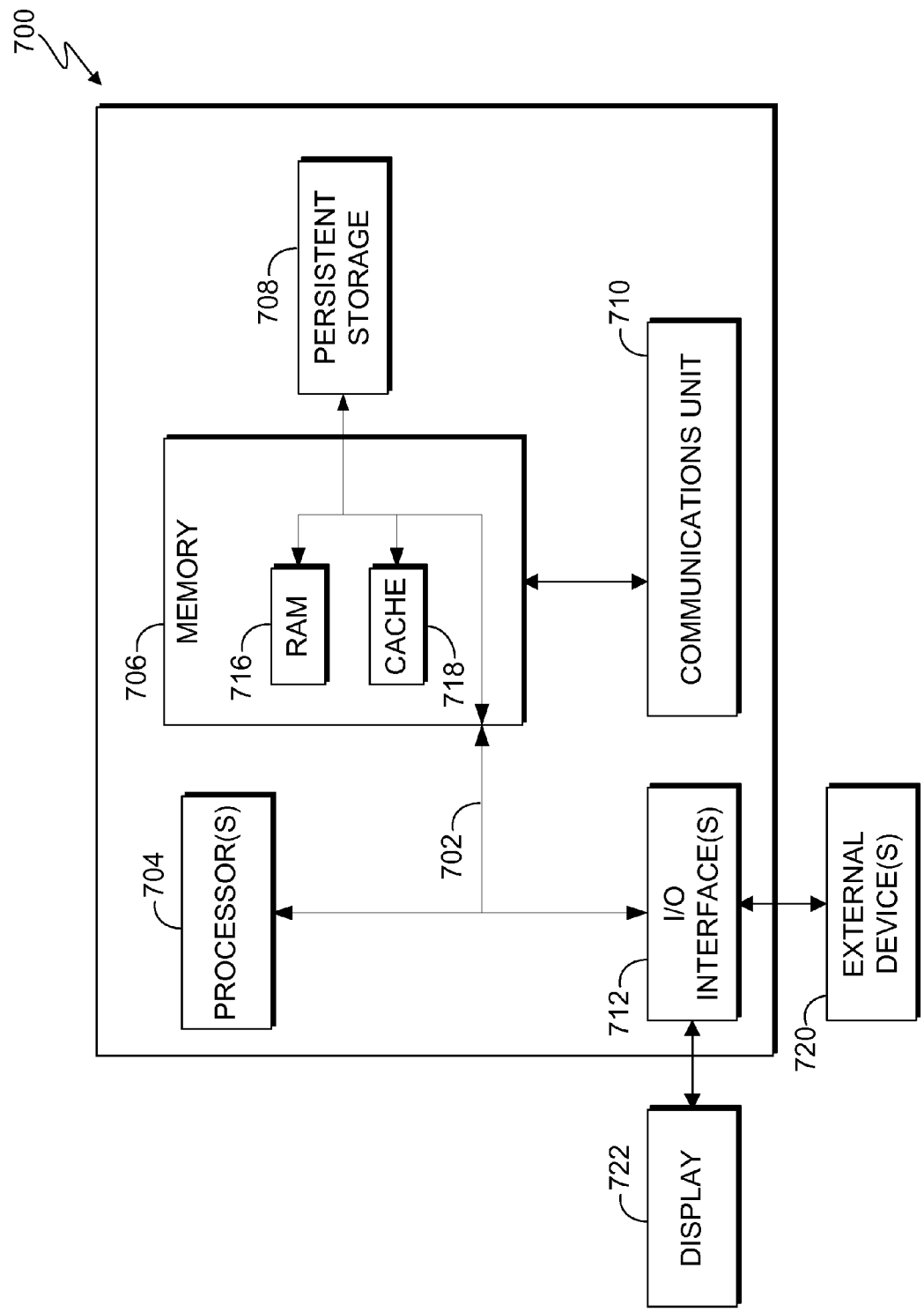
FIG. 7 is a block diagram of internal and external components of a computer system, in accordance with an embodiment of the present invention.

FIG. 7 is a block diagram of internal and external components of computing device 700, which is representative of the computing devices of FIG. 1, in accordance with an embodiment of the present invention. It should be appreciated that FIG. 7 provides only an illustration of one implementation and does not imply any limitations with regard to the environments in which different embodiments may be implemented. In general, the components illustrated in FIG. 7 are representative of any electronic device capable of executing machine-readable program instructions. Examples of computer systems, environments, and/or configurations that may be represented by the components illustrated in FIG. 7 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 700 includes communications fabric 702, which provides for communications between one or more processing units 704, memory 706, persistent storage 708, communications unit 710, and one or more input/output (I/O) interfaces 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 716 and cache memory 718. In general, memory 706 can include any suitable volatile or non-volatile computer readable storage media. Software is stored in persistent storage 708 for execution and/or access by one or more of the respective processors 704 via one or more memories of memory 706.

Persistent storage 708 may include, for example, a plurality of magnetic hard disk drives. Alternatively, or in addition to magnetic hard disk drives, persistent storage 708 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 708 can also be removable. For example, a removable hard drive can be used for persistent storage 708. Other examples include optical and magnetic disks, thumb drives, and smart cards that are inserted into a drive for transfer onto another computer readable storage medium that is also part of persistent storage 708.

Communications unit 710 provides for communications with other computer systems or devices via a network. In this exemplary embodiment, communications unit 710 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 700 through communications unit 710 (i.e., via the Internet, a local area network, or other wide area network). From communications unit 710, the software and data can be loaded onto persistent storage 708.

One or more I/O interfaces 712 allow for input and output of data with other devices that may be connected to computing device 700. For example, I/O interface 712 can provide a connection to one or more external devices 720 such as a keyboard, computer mouse, touch screen, virtual keyboard, touch pad, pointing device, or other human interface devices. External devices 720 can also include portable computer readable storage media such as, for example, thumb drives, portable optical or magnetic disks, and memory cards. I/O interface 712 also connects to display 722.

Display 722 provides a mechanism to display data to a user and can be, for example, a computer monitor. Display 722 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for dynamically controlling an alert function, the method comprising:
receiving, by one or more computer processors, of a wearable device operatively connected to a meeting schedule, a set of data regarding the meeting schedule;
determining, by the one or more computer processors, whether a user is engaged in a conversation with at least one person based in part on the meeting schedule;
in response to determining that said user is engaged in a conversation with at least one person, determining, by the one or more computer processors, whether said at least one person is an important person, wherein determining whether said at least one person is an important person comprises:
identifying, by the one or more computer processors, said at least one person, using at least one of: facial recognition technology and voice identification technology;
determining, by the one or more computer processors, a personal connection score between said user and said at least one person, wherein said personal connection score is based, in part, on a relationship of said at least one person to said user and a difference in age of said at least one person to said user;
determining, by the one or more computer processors, a frequency of contact score between said user and said at least one person, wherein the frequency of contact score is based on a number of interactions between said user and said at least one person; and
storing, by the one or more computer processors, data associated with the identified at least one person, the personal connection score, and the frequency of contact score, in a database;
in response to determining that said at least one person is an important person, determining, by the one or more computer processors, whether an alert function is enabled on the wearable device; and
in response to determining that said alert function is enabled on said wearable device, disabling, by the one or more computer processors, said alert function, wherein disabling said alert function limits incoming notifications, based on a predefined notification setting.

2. The method of claim 1, further comprising:
in response to determining that said user is not engaged in a conversation with at least one person, determining, by the one or more computer processors, whether an alert function is disabled on the wearable device; and
in response to determining that said alert function is disabled, enabling, by the one or more computer processors, said alert function on said wearable device.

3. The method of claim 1, further comprising:
in response to determining that said at least one person is not an important person, determining, by the one or more computer processors, whether an alert function is disabled on the wearable device; and
in response to determining that said alert function is disabled, enabling, by the one or more computer processors, said alert function on said wearable device.

4. The method of claim 1, wherein said set of data is received from a calendar, wherein said calendar contains one or more scheduled conversations with said at least one person.

5. The method of claim 1, further comprising:
detecting, by the one or more computer processors, a countenance of said at least one person;
detecting, by the one or more computer processors, a blood alcohol content of said user; and
detecting, by the one or more computer processors, a level of perspiration of said user.

6. The method of claim 1, wherein identifying said at least one person comprises:
recognizing, by a microphone, a set of vocal characteristics of said at least one person; and
recognizing, by a camera, a set of facial features of said at least one person.

7. The method of claim 6, wherein determining whether said at least one person is an important person comprises:
determining an overall score, based on a combination of at least the personal connection score, the frequency of contact score, a countenance of said at least one person, a blood alcohol content of said user, and a level of perspiration of said user.

8. A computer program product comprising:
a non-transitory computer readable storage medium and program instructions stored on the non-transitory computer readable storage medium, the program instructions comprising:
program instructions to receive, at a wearable device operatively connected to a meeting schedule, a set of data regarding the meeting schedule;
program instructions to determine whether a user is engaged in a conversation with at least one person based in part on the meeting schedule;
program instructions to, in response to determining that said user is engaged in a conversation with at least one person, determine whether said at least one person is an important person, wherein the program instructions to determine whether said at least one person is an important person comprises:
program instructions to identify said at least one person, using at least one of:
facial recognition technology and voice identification technology;
program instructions to determine a personal connection score between said user and said at least one person, wherein said personal connection score is based, in part, on a relationship of said at least one person to said user and a difference in age of said at least one person to said user;
program instructions to determine a frequency of contact score between said user and said at least one person, wherein the frequency of contact score is based on a number of interactions between said user and said at least one person; and
program instructions to store data associated with the identified at least one person, the personal connection score, and the frequency of contact score, in a database;

program instructions to, in response to determining that said at least one person is an important person, determine whether an alert function is enabled on the wearable device; and program instructions to, in response to determining that said alert function is enabled on said wearable device, disable said alert function, wherein the program instructions to disable said alert function limit incoming notifications, based on a predefined notification setting.

9. The computer program product of claim 8, further comprising:

program instructions to, in response to determining that said user is not engaged in a conversation with at least one person, determine whether an alert function is disabled on the wearable device; and program instructions to, in response to determining that said alert function is disabled, enable said alert function on said wearable device.

10. The computer program product of claim 8, further comprising:

program instructions to, in response to determining that said at least one person is not an important person, determine whether an alert function is disabled on the wearable device; and program instructions to, in response to determining that said alert function is disabled, enable said alert function on said wearable device.

11. The computer program product of claim 8, wherein said set of data is received from a calendar, wherein said calendar contains one or more scheduled conversations with said at least one person.

12. The computer program product of claim 8, further comprising:

program instructions to detect a countenance of said at least one person;

program instructions to detect a blood alcohol content of said user; and program instructions to detect a level of perspiration of said user.

13. The computer program product of claim 8, wherein the program instructions to identify said at least one person comprise:

program instructions to recognize, by a microphone, a set of vocal characteristics of said at least one person; and program instructions to recognize, by a camera, a set of facial features of said at least one person.

14. The computer program product of claim 13, wherein the program instructions to determine whether said at least one person is an important person comprise:

program instructions to determine an overall score, based on a combination of at least the personal connection score, the frequency of contact score, a countenance of said at least one person, a blood alcohol content of said user, and a level of perspiration of said user.

15. A computer system comprising:

one or more computer processors;

one or more non-transitory computer readable storage media;

program instructions stored on the non-transitory computer readable storage media for execution by at least one of the one or more computer processors, the program instructions comprising:

program instructions to receive, at a wearable device operatively connected to a meeting schedule, a set of data regarding the meeting schedule;

program instructions to determine whether a user is engaged in a conversation with at least one person based in part on the meeting schedule;

program instructions to, in response to determining that said user is engaged in a conversation with at least one person, determine whether said at least one person is an important person, wherein the program instructions to determine whether said at least one person is an important user comprises:

program instructions to identify said at least one person, using at least one of:

facial recognition technology and voice identification technology;

program instructions to determine a personal connection score between said user and said at least one person, wherein said personal connection score is based, in part, on a relationship of said at least one person to said user and a difference in age of said at least one person to said user;

program instructions to determine a frequency of contact score between said user and said at least one person, wherein the frequency of contact score is based on a number of interactions between said user and said at least one person; and program instructions to store data associated with the identified at least one person, the personal connection score, and the frequency of contact score, in a database;

program instructions to, in response to determining that said at least one person is an important person, determine whether an alert function is enabled on the wearable device; and program instructions to, in response to determining that said alert function is enabled on said wearable device, disable said alert function, wherein the program instructions to disable said alert function limit incoming notifications, based on a predefined notification setting.

16. The computer system of claim 15, further comprising:

program instructions to, in response to determining that said user is not engaged in a conversation with at least one person, determine whether an alert function is disabled on the wearable device; and program instructions to, in response to determining that said alert function is disabled, enable said alert function on said wearable device.

17. The computer system of claim 15, further comprising:

program instructions to, in response to determining that said at least one person is not an important person, determine whether an alert function is disabled on the wearable device; and program instructions to, in response to determining that said alert function is disabled, enable said alert function on said wearable device.

18. The computer system of claim 15, wherein said set of data is received from a calendar, wherein said calendar contains one or more scheduled conversations with said at least one person.

19. The computer system of claim 15, further comprising:

program instructions to detect a countenance of said at least one person;

program instructions to detect a blood alcohol content of said user; and program instructions to detect a level of perspiration of said user.

20. The computer system of claim 15, wherein the program instructions to identify said at least one person comprise:

program instructions to recognize, by a microphone, a set of vocal characteristics of said at least one person; and program instructions to recognize, by a camera, a set of facial features of said at least one person.

21. The computer system of claim 20, wherein the program instructions to determine whether said at least one person is an important person comprise:

program instructions to determine an overall score, based on a combination of at least the personal connection score, the frequency of contact score, a countenance of said at least one person, a blood alcohol content of said user, and a level of perspiration of said user.

* * * * *